United States Patent

Horton et al.

[15] 3,668,160

[45] June 6, 1972

[54] RESIN-COATED SAND MIXES FOR SHELL MOLDING

[72] Inventors: Robert A. Horton, Chesterland; Timothy L. Coghill, Mentor, both of Ohio

[73] Assignee: Precision Metalsmiths, Inc.

[22] Filed: Apr. 21, 1969

[21] Appl. No.: 818,118

[52] U.S. Cl. ...........................260/19 R, 106/38.2, 106/38.7, 164/43, 260/33.4 R, 260/33.6 R, 260/DIG. 40
[51] Int. Cl. ....................B22c 1/22, C08g 5/20, C08g 51/72
[58] Field of Search ..................164/43; 260/31.2 T, 31.8 T, 260/19 R, 33.4 R, DIG. 40, 33.6 R; 117/5.2; 106/38.2, 38.7

[56] References Cited

UNITED STATES PATENTS

| | | | |
|---|---|---|---|
| 2,433,168 | 12/1947 | Staeger | 164/43 |
| 3,027,265 | 3/1962 | Miericke | 106/38.7 |
| 1,982,787 | 12/1934 | Cherry | 260/31.2 |
| 2,765,507 | 10/1956 | Wolf et al. | 164/43 |
| 2,841,845 | 7/1958 | Bleuenstein | 164/43 |
| 2,848,772 | 8/1958 | Kremer | 164/43 |
| 2,912,406 | 11/1959 | Less et al. | 260/31.8 |
| 2,943,068 | 6/1960 | Freedman | 260/19 |
| 2,967,338 | 1/1961 | Cooper | 164/43 |

OTHER PUBLICATIONS

Salzberg et al., Phenolic Resin Bond in Solid Sand Cores, Modern Castings, July 1960, Pages 101– 110.

Chemical Abstracts, Volumes 56– 65 Seventh Collective Index–CHQ– DIB, Page 6948S.

Chemical Absracts, Volume 57, No. 7, 10/1/1962, Page 8799e.

Primary Examiner—Donald E. Czaja
Assistant Examiner—Ronald W. Griffin
Attorney—Watts, Hoffmann, Fisher & Heinke

[57] ABSTRACT

For use in resin-shell molding, a resin-coated sand mix containing a small percentage of a non-volatile, oily, organic liquid suitable to alleviate the condition of peel-back.

8 Claims, No Drawings

RESIN-COATED SAND MIXES FOR SHELL MOLDING

BACKGROUND OF THE INVENTION

The present invention relates generally to the art of resin-shell molding, and more specifically to new resin-coated sand mixes containing additives which are effective to alleviate the condition of peel-back.

The process of resin-shell molding, sometimes referred to as the Croning or C-process, involves the formation of molds and cores from thermosetting resin-bonded sand mixtures which are brought in contact with preheated metal patterns. In carrying out the process, a suitable sand mixture including the resin binder is dumped onto the metal pattern which is normally heated in the range of from 300° to 600° F. The resin adjacent the hot pattern surface softens under the heat and flows around the sand grains to bond them together into a thin, soft layer usually three-sixteenths to one-fourth inch in thickness. The pattern is then inverted and the excess resin-sand mixture which has not been affected by the heat falls away leaving behind a bonded shell adhering to the pattern. The bonded shell is further heated to cure the resin and harden the shell which is then removed from the pattern ready for use. Molds and cores made in this manner exhibit good strength, smooth surfaces, high permeability to mold gases, easy collapsibility after casting, and good dimensional accuracy. Consequently, the resin-shell molding process has an important place in the foundry industry in spite of the relatively high cost of resin binders.

When originally introduced to the foundry industry, mechanical mixtures of dry sand and dry resin powder were used in the resin-molding process. Dry mixes of resin and sand had certain disadvantages, including dusting and segregation, which made the mixes difficult to use and resulted in sticking of the shells to the patterns and the production of non-uniform shell densities. In an effort to overcome the problem of controlling dust during mixing and shell formation, wetting agents were sometimes used in the dry mixes. Typical wetting agents which have been used include kerosene and spindle oil. The use of wetting agents, while desirable to control dustiness, has been recognized in certain product operations to have detrimental effects upon shell strength.

An important advance in the art of resin shell molding has been the introduction of resin-coated sand which eliminates the problems of dust, segregation and non-uniformity. Since the problems of dusting and segregation are not encountered with resin-coated sands, the wetting agents previously used in dry mixes have been considered unnecessary and have not been used in order to avoid any effect of lessening the shell strength.

Although resin-coated sands are now widely used in resin-shell molding processes, a persistent problem has been the occurrence of a condition where a secondary, partially softened layer of the shell delaminates or peels off when the pattern is inverted and falls into the dump box of the molding machine, leaving a thin and partially cured layer of material adhering to the inverted pattern. The result is that the shell has inadequate thickness in the areas affected and cannot contain the molten metal cast into it. The lumps of fused and partially cured material which peel from the pattern accumulate in the dump box of the molding machine and can result in other types of defects affecting all parts of the shell. This condition, which is most common in the production of large molds and cores, is referred to by various terms, but is usually known as "peel-back", and is so referred to in this disclosure.

Various suggestions have been made in the past to eliminate the condition of peel-back. For example, lower pattern or core box temperatures and shorter dwell times are often recommended, the theory being that, by building up a thinner fused layer, there will be less weight tending to cause a secondary layer of material to peel off and that, in addition, a more uniform cure is possible throughout the shell cross section. The difficulty with these suggestions is that in many product operations the proper combination of temperature and dwell time necessary to produce shells without peel-back result in shells that are too thin for normal handling and/or casting. In many cases it is impossible to obtain the necessary strength and thickness by molding operations in which the temperature and dwell time are sufficiently short to eliminate peel-back.

Another approach to combating peel-back has been the introduction of a double-shot method of molding. In the double-shot method of molding, the shell is produced in two stages, a thin shell being formed and cured in a first shot and a second shell layer being formed in the second shot which hopefully fuses with the first layer. This method has proven only partially successful and requires modifications of automatic molding machines and longer dwell times.

Still other approaches have been to insert a secondary burner inside of the hollow shell after the dump box recedes in an attempt to cure the shell before any secondary layer of material can fall away. This procedure is inconvenient, difficult to control and is not always successful. Faster curing resins also have been tried with only slight improvements in results. Because of the difficulties involved in the prior art approaches to combating peel-back, manual patching of the peel-back areas often is necessary as a last resort.

SUMMARY OF THE INVENTION

An object of the present invention is to overcome the problem of peel-back and more particularly to provide a resin-coated sand mix which is resistant to the occurrence of peel-back in molding operations.

Another object of the invention is to provide an economical and practical solution to the condition of peel-back which is applicable over a wide range of operating conditions and sizes and shapes of molded shells, and which solution does not require special equipment and/or extra steps in the resin-shell molding process.

The present invention is based on the discovery that resin-coated sand mixes can be made resistant to peel-back by including in the mix a small percentage of a suitable additive which does not interfere unduly with the setting of the resin. More particularly, the invention contemplates a resin-coated sand mix containing a small percentage of a non-volatile, oily, organic liquid having a viscosity in the range of from 5 to 350 centipoise at 80° F.

When using resin-coated sand mixes formulated in accordance with this invention, longer dwell times and higher pattern temperatures can be tolerated in order to obtain molded shells of the desired thickness and strength without encountering the condition of peel-back. Further, the new resin-coated sand mixes can be used in conventional core blowing equipment without modification of the machines and without extending the cycle times. The use of the new resin-coated sand mixtures has the still further advantage of minimizing the need for manual patching of molded shells such as has been resorted to in the past in operations where peel-back has been encountered.

Other objects, advantages, and a fuller understanding of the invention will be had from the following detailed description.

DESCRIPTION OF THE PREFERRED EMBODIMENTS

Various resin-coated sands are commercially available for use in resin-shell molding processes. The typically used sands are zircon, silica and olivine including forsterite. While many materials have been tried as bonding agents, thermosetting phenolic resins have been found to be most satisfactory and are preferred. As is well known, there are a number of different methods used to produce satisfactory resin-coated sand and such methods fall into the classifications of cold, warm, and hot coating processes.

In accordance with the present invention, a small percentage of a non-volatile, oily, organic liquid, preferably having a viscosity between 5 and 350 centipoise at 80° F., is added to the resin-coated sand mix in order to make it resistant to the occurrence of peel-back during molding. The selected liquid should preferably be one that does not adversely effect the strength or setting time of the resin. Nevertheless, because of various considerations, a number of liquids which do not meet this ideal may still be used as an additive. The strength requirements of cores and shells vary depending upon their applications and therefore conditions of reduced strength caused by the additive can be tolerated in some instances and can be remedied in others either by a small increase in the percentage of resin present or by an increase in the shell thickness obtained by longer setting times. Longer setting times are possible because of the use of the additive which alleviates the condition of peel-back that would otherwise occur. It has also been found that a liquid which is not practical with one resin because of the adverse effect on strength or setting time is perfectly satisfactory with a resin of a different type.

Suitable liquids which can be used in accordance with the present invention include the mineral oils generally comprised of mixtures of hydrocarbons; the fatty or fixed oils obtained from plants and animals and comprised largely of triglycerides; and various other organic liquids including synthetic fluids. The term organic is used to include the various silicone oils or fluids.

Specific examples of usable mineral oils include spindle oil, paraffin oil, and the like. Suitable fatty oils include corn oil, cottonseed oil, oleic acid and the like. Other usable liquids include cyclohexanol, butyl stearate, and silicone fluids or oils, such as Dow-Corning Silicone 200.

While all of the liquids mentioned above are usable, not all are equally preferred. Silicone oils, for example, are expensive compared to many of the other materials. Oleic acid has some tendency to interfere with proper setting of the resin, thereby resulting in somewhat lower shell strength, and also may result in the molding of solid articles instead of the formation of thin shells. Oleic acid is nevertheless effective in combating peel-back and can be used in making many types of cores and shells which are perfectly satisfactory. Certain of the liquids falling into the preferred categories are considered drying or semi-drying oils in that, when spread in a thin film, they absorb oxygen from the air and harden to form a tough, elastic film. Such oils often can be used, but mixes containing them may have only a limited shelf life. Other liquids tend to cause the powdered sand mix to form lumps and in this way limit the ability of the mix to perform well in automatic sand feed systems. Sand mixes containing such liquids can nevertheless be used satisfactorily in manual feed systems and in properly modified automatic equipment.

Two liquids which are preferred are spindle oil and n-butyl stearate. The latter liquid, in particular, produces free-flowing mixes largely free of lumps. This characteristic may be related to the fact that the melting point of n-butyl stearate is near room temperature. Corn oil has the advantage of masking the pungent, unpleasant odors normally produced in resin-shell molding operations, and mixes containing corn oil have a pleasant popcorn-type odor in use.

The minimum proportion of liquid additive which has been found useful successfully to combat peel-back is equal to the ratio of 35 milliliters of liquid to 200 pounds of sand or approximately 0.03 percent of liquid additive by weight of sand. The maximum amount of liquid additive should not exceed 200 milliliters per 200 pounds of sand or approximately 0.175 percent of liquid by weight of sand and more preferably should not exceed 160 milliliters per 200 pounds of sand or approximately 0.14 percent of liquid by weight of sand. The preferred range of additive is from 50 to 100 milliliters per 200 pounds of sand or about 0.045 to 0.09 percent of liquid by weight of sand.

It is important in the practice of the present invention to avoid using amounts of the liquid additive which are in excess of those set forth above. Excessive amounts of the liquid additive adversely effect the sand flow properties and may lessen the shell strength, as well as causing other detrimental effects in certain product operations. For example, additions of the liquid in amounts greater than about 160 milliliters per 200 pounds of sand tend to make the sand damp and thus reduce its free flowing characteristics which are desired in the successful operation of automatic and semi-automatic core blowing equipment. When the liquid additive is present in amounts in excess of about 200 milliliters per 200 pounds of sand or about 0.175 percent liquid by weight of sand, the sand becomes so damp that it may be retained in the magazine or blowhead of conventional blowing machines.

In general, shells and cores made from mixes containing silica sands are less susceptible to the condition of peel-back than shells made from mixes of other sands. Possibly because of its relatively lower density, silica sand mixes form a thicker layer on the pattern, although the area effected by peel-back may be the same as with other sands. In spite of its high susceptibility to peel-back, zircon sand is most often used in resin-shell molding processes where high dimensional accuracy is required, since its thermal expansion is only about one-third that of silica sand. The high sintering point and high thermal conductivity of zircon sand are also advantageous in many applications. When using zircon sands, an amount of liquid additive in the range of from 75 to 100 milliliters per 200 pounds of sand has been found to be satisfactory for most molding operations. When using silica sands, a somewhat smaller amount of additive in the range of from 50 to 75 milliliters per 200 pounds of sand has been found satisfactory for most molding operations.

EXAMPLE I

A commercially available, zircon sand coated with 1.5 percent of a phenolic resin was mixed in a ribbon blender with corn oil in an amount of 75 milliliters of liquid per 200 pounds of sand. Dome-shaped cores were produced on a Shalco U–180 Core Blower operating at 500° to 510° F. The cores were free of peel-back and were satisfactory in all respects. The corn oil odor produced during heating and curing of the sand effectively masked the usual pungent odor present during the use of this type of coated sand.

Cores made with the same sand under the same operating conditions but without the addition of corn oil to the sand mix had serious conditions of peel-back on their top portions or ends.

EXAMPLE II

The resin-coated zircon sand of Example I was mixed with paraffin oil in an amount of 75 milliliters per 200 pounds of sand, and cores were made under the same operating conditions as in the previous example. The cores were free of peel-back in all instances.

EXAMPLE III

The resin-coated sand of Example I was used with a large size core box and a small size core box to produce 12 cores of each size. The cores were made at 12 different temperatures spaced between 425° and 595° F. Serious peel-back conditions were encountered on both sizes of cores at every temperature.

The same mix was modified by the addition of n-butyl stearate in an amount of 75 milliliters per 200 pounds of sand. Cores were made with each box at nine different temperatures spaced between 465° and 540° F. The small cores were completely free of peel-back over the entire temperature range. The larger core produced at 465° F. exhibited a minor peel-back condition, but to a much less extent than the large core made at the same temperature without the addition of n-butyl stearate to the mix. A slight condition of peel-back also occurred on the large core made at 535° F. There was no occurrence of peel-back on the large cores made at temperatures of 480° F., 495° F., 510° F., 530° F., and 540° F.

EXAMPLE IV

The same two core boxes used in Example III were used to produce cores from a resin-coated zircon sand obtained from a different commercial source and coated with 1.5 percent of a different phenolic resin. Cores produced at 500° to 510° F. had extremely severe conditions of peel-back which were worse than the conditions obtained with the unmodified mix used in Example I. The mix was then modified by the addition of 75 milliliters of spindle oil No. 9 per 200 pounds of the coated sand. The cores produced were found to be either completely free of peel-back or to have only a slight trace of this condition.

EXAMPLE V

A commercially available silica sand coated with 4 percent of a phenolic resin was used with the large size core box of Example III and IV to produce cores at temperatures between 530° to 550°0 F. The resulting cores all exhibited peel-back in the same general locations as when using resin-coated zircon sand. The areas affected by peel-back were substantially the same as with zircon sand, although a greater thickness of material remained on the pattern.

The same resin-coated silica sand mix was modified by the addition of 56 milliliters of spindle oil per 200 pounds of sand and cores were made under the same conditions as described in the previous paragraph.

The addition of the spindle oil materially reduced the peel-back condition on all cores and completely eliminated it in some instances.

EXAMPLE VI

A commercially available olivine sand coated with 4.5 percent of a phenolic resin was used to make cores using the same large core box as in the previous example at a temperature of 540° F. Each of the cores produced exhibited extremely bad peel-back conditions. The resin-coated olivine sand mix was modified by the addition of 75 milliliters of spindle oil per 200 pounds of sand and cores were made under the same conditions. The addition of the spindle oil in the amount indicated resulted in a substantial reduction of peel-back in all cases. In another series of tests, spindle oil in an amount of 100 milliliters per 200 pounds of sand was added to the resin-coated olivine sand mix and was found to result in the complete elimination of peel-back.

It will be apparent from the foregoing that the invention provides a practical solution which alleviates the condition of peel-back encountered in resin-shell molding operations. The preferred additives can be simply and economically included in a resin-coated sand mix to make it resistant to peel-back, thereby eliminating the need for special equipment and/or extra steps in the molding process heretofore required in carrying out prior art proposals for eliminating peel-back. Inasmuch as the liquid additives can be added to the finished, coated sand, the invention can be practiced using coated sands made by the cold, warm and hot coating processes known in the art. Among other advantages, the invention permits the use of other additives commonly employed in resin-shell molding sands, such as wax lubricants, wood flour, iron oxide, manganese dioxide, and the like.

Many modifications and variations of the invention will be apparent to those skilled in the art in the light of the foregoing detailed disclosure. Therefore, it is to be understood that, within the scope of the appended claims, the invention can be practiced otherwise than as specifically described.

What is claimed is:

1. For use in resin-shell molding, a thermosetting resin-coated sand mix containing a mineral oil, the oil being present in a proportion of from 35 to 200 milliliters per 200 pounds of sand and being selected from the group consisting of spindle oil and paraffin oil.

2. For use in resin-shell molding, a thermosetting resin-coated sand mix containing a fatty oil, the oil being present in a proportion of from 35 to 200 milliliters per 200 pounds of sand.

3. A resin-coated sand mix as claimed in claim 2 wherein the fatty oil is selected from the group consisting of corn oil and cottonseed oil.

4. For use in resin-shell molding, a thermosetting resin-coated sand mix containing in a proportion of from 35 to 200 milliliters per 200 pounds of sand at least one substance selected from the group consisting of spindle oil, paraffin oil, fatty oils, oleic acid, cyclohexanol and butyl stearate.

5. For use in resin-shell molding, a thermosetting, resin-coated sand mix containing oleic acid in a proportion of from 35 to 200 milliliters per 200 pounds of sand.

6. For use in resin-shell molding, a thermosetting resin-coated sand mix containing cyclohexanol in a proportion of from 35 to 200 milliliters per 200 pounds of sand.

7. For use in resin-shell molding, a thermosetting resin-coated sand mix containing butyl stearate in a proportion of from 35 to 200 milliliters per 200 pounds of sand.

8. For use in resin-shell molding, a thermosetting resin-coated sand mix containing in a proportion of from 35 to 200 milliliters per 200 pounds of sand at least one substance selected from the group consisting of spindle oil, paraffin oil, corn oil, cottonseed oil, oleic acid, cyclohexanol and butyl stearate.

* * * * *